(12) United States Patent
Ono et al.

(10) Patent No.: US 6,868,404 B1
(45) Date of Patent: Mar. 15, 2005

(54) DIGITAL DATA RECORDING DEVICE, DIGITAL DATA MEMORY DEVICE, AND DIGITAL DATA UTILIZING DEVICE FOR CONVERTING MANAGEMENT INFORMATION WHICH CONTAINS RESTRICTIVE INFORMATION USING A DIFFERENT KEY IN EACH MANAGEMENT INFORMATION SEND/RECEIVE SESSION

(75) Inventors: Takatoshi Ono, Aichi-ken (JP); Shunji Harada, Osaka (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 930 days.

(21) Appl. No.: 09/591,519

(22) Filed: Jun. 9, 2000

(30) Foreign Application Priority Data

Jun. 15, 1999 (JP) .......................................... 11-167897
May 15, 2000 (JP) ...................................... 2000-148962

(51) Int. Cl.⁷ .......................... G06F 1/00; G11B 20/00
(52) U.S. Cl. ........................... 705/55; 705/50; 705/51; 705/52; 705/53; 705/54; 705/56; 713/200; 713/201; 713/202; 380/201; 380/202; 380/203; 380/204
(58) Field of Search .............................. 705/55, 50, 51, 705/52, 53, 54, 56, 57, 58, 59, 60; 369/273, 286, 53, 84; 380/201, 202, 203, 204; 713/200, 201, 202

(56) References Cited

U.S. PATENT DOCUMENTS

| 5,555,304 | A | * | 9/1996 | Hasebe et al. ................. 705/51 |
| 5,883,958 | A | * | 3/1999 | Ishiguro et al. ............... 705/57 |
| 6,072,874 | A | * | 6/2000 | Shin et al. ................... 380/231 |
| 6,343,281 | B1 | * | 1/2002 | Kato ........................... 705/57 |
| 6,510,118 | B1 | * | 1/2003 | Morikawa ..................... 369/84 |
| 2002/0069355 | A1 | * | 6/2002 | Garrison ..................... 713/153 |

FOREIGN PATENT DOCUMENTS

| EP | 0 994 475 | | 4/2000 | |
| EP | 1 069 491 | | 1/2001 | |
| EP | 1 069 564 | | 1/2001 | |
| JP | 07-028405 | | 1/1995 | |
| JP | 08-139718 | | 5/1996 | |
| JP | 9-205424 | | 8/1997 | |
| JP | 11-39795 | | 2/1999 | |
| JP | 1 069 564 | A2 * | 10/2000 | ........... G11B/20/00 |
| JP | 1 069 491 | A2 * | 2/2001 | ............. G06F/1/00 |
| WO | WO 01/52234 | | 7/2001 | |

OTHER PUBLICATIONS

Protect music copyrights with small memory cards, Nikkei Electronics, No. 739, pp. 49–53, Mar. 22, 1999.*

Introduction to Theory of Cryptology by Eiji Okamoto, Kyoritsu, 1993 with partial translation.

Studies on Data Protection and Encrypton: Security of Computer Nerwork, Shin Hitotsumatsu (ed.), Nihon Keizai Shimbun, Inc., 1983 with partial translation.

Protect Music Copyrights With Small Memory Cards, Nikkei Electronics, No. 739, pp. 49–53, Mar. 22, 1999 with partial translation.

Trends in Digital Copy Protection Technologies, K. Yamanaka et al., NTT Review, Telecommunications Assoc., Tokyo, JP, vol. 11, No. 1, Jan. 1999, pp. 108–115.

\* cited by examiner

*Primary Examiner*—James P. Trammell
*Assistant Examiner*—C Owen Sherr

(57) ABSTRACT

In each digital content utilize session, a memory card generates conversion key information for specifying a data conversion, while a player generates inverse conversion key information for specifying an inverse data conversion. The memory card then performs the data conversion specified by the conversion key information on management information stored therein, and sends the converted management information and digital content stored therein to the player. The player performs the inverse data conversion specified by the inverse conversion key information on the converted management information to restore the management information, and utilizes the digital content in accordance with restrictions set in the restored management information to limit the use of the digital content.

26 Claims, 7 Drawing Sheets

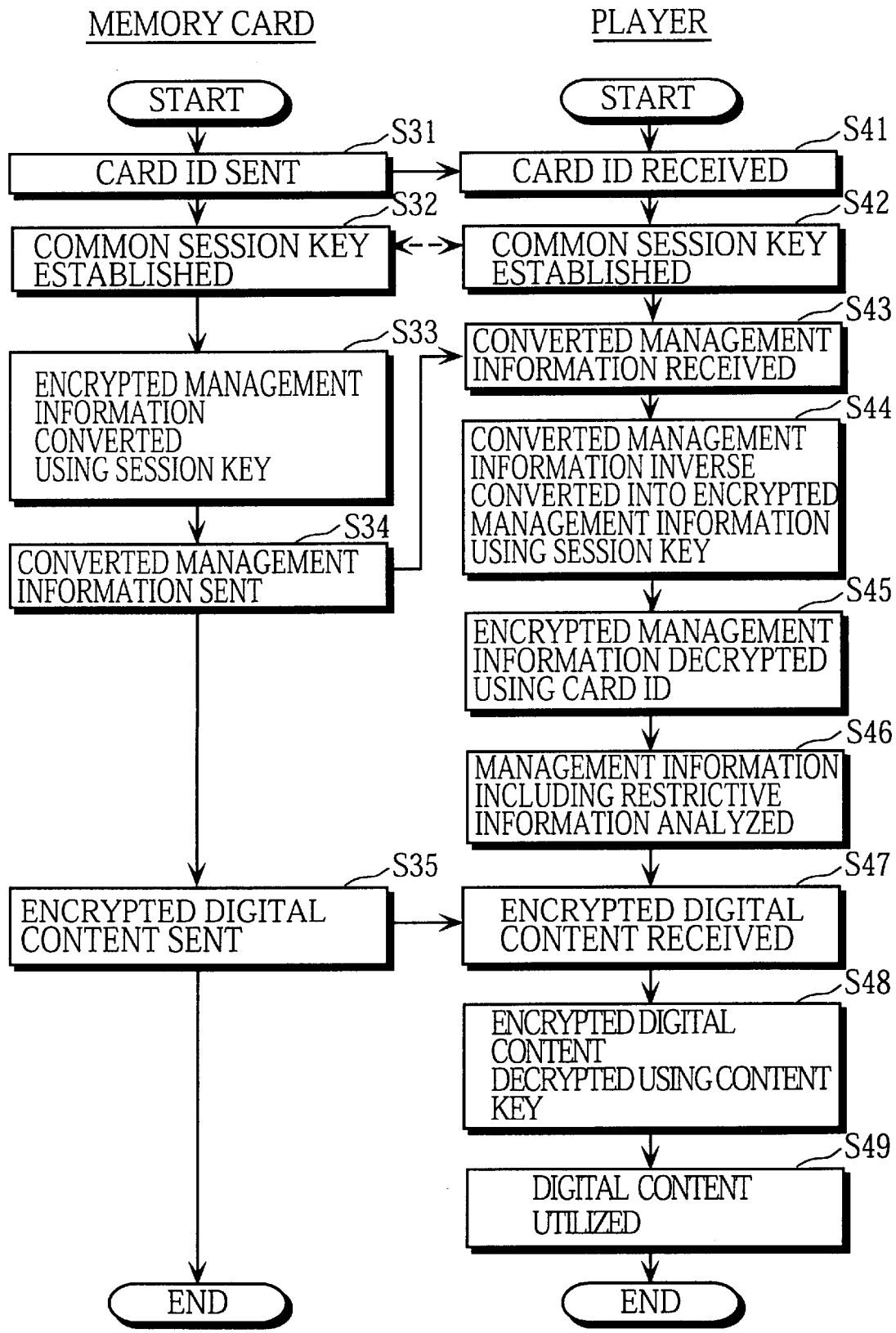

DIGITAL DATA RECORDING DEVICE, DIGITAL DATA MEMORY DEVICE, AND DIGITAL DATA UTILIZING DEVICE FOR CONVERTING MANAGEMENT INFORMATION WHICH CONTAINS RESTRICTIVE INFORMATION USING A DIFFERENT KEY IN EACH MANAGEMENT INFORMATION SEND/RECEIVE SESSION

This application is based on applications Nos. H11-167897 and 2000-148962 filed in Japan, the contents of which are hereby incorporated by reference.

BACKGROUND OF THE INVENTION

1. Field of the Invention

The present invention relates to devices for recording and utilizing digital data, and in particular relates to a technique for preventing unauthorized use of digital data.

2. Description of the Related Art

The digitization of information is increasing in recent years. Since digitized information (hereinafter, "digital content") is not only relatively easy to handle but also will not deteriorate with time, information such as audio and image data is becoming more and more digitized.

However, if digital content is copied, the copy will end up being precisely identical to the original. This provokes unauthorized acts such as illegal duplication or tampering of copyrighted information.

To discourage such unauthorized acts, a method is devised whereby storage mediums such as memory cards are respectively given unique numbers (hereinafter, "card IDs") so that each storage medium stores only digital content encrypted using its own card ID.

According to this method, even when digital content which has been encrypted with a card ID of some memory card and stored on the memory card is copied onto another memory card, the copy of the encrypted digital content cannot be decrypted with a card ID of the latter memory card. Hence the digital content can be protected against such unauthorized copying.

Here, the digital content may be accompanied with restrictive information that restricts the use of the digital content to a limited number of times or to limited usage conditions.

By encrypting this restrictive information using the card ID and storing it onto the memory card in the same way as the digital content, the restrictive information can be protected from unauthorized copying as with the digital content.

Nevertheless, when the restrictive information contains information whose value changes over time, such as a limitation on the number of times the digital content can be used, then even if the restrictive information is encrypted with the unique card ID, it cannot be fully protected against falsification. That is to say, the user who receives the restrictive information of high value can make a backup copy of it and in later use replace the restrictive information of decreasing value with the backup copy.

SUMMARY OF THE INVENTION

In view of the above problem, the present invention aims to provide a digital data recording device, digital data memory device, and digital data utilizing device that prevent unauthorized acts such as backup copying restrictive information and later replacing the restrictive information with the backup copy, digital data recording and utilizing methods for delivering the above effect, and computer-readable storage mediums storing programs for implementing the above methods.

To achieve the stated object, the invention provides a digital data intelligent memory device for sending digital data and management information that contains information for restricting the use of the digital data, to a digital data utilizing device, including: a management information storing unit for storing the management information; a digital data storing unit for storing the digital data; a key information acquiring unit for acquiring key information which differs in each send session; a data converting unit for performing a data conversion specified by the acquired key information, on the management information stored in the management information storing unit, to generate converted management information; and a sending unit for sending the digital data stored in the digital data storing unit and the converted management information generated by the data converting unit, to the digital data utilizing device.

With this construction, the digital data intelligent memory device converts the management information based on the key information which differs in each send session, before sending it to the digital data utilizing device. Accordingly, even when the converted management information is backup copied in an earlier session and replaced with the backup copy in a later session without authorization, the backup copy is useless, as it cannot be inverse converted properly with key information of the later session.

Here, the key information acquiring unit may acquire the key information as a common key in a common key cipher, the key information being also acquired by the digital data utilizing device, wherein the data converting unit encrypts the management information using the key information according to the common key cipher, to generate the converted management information.

With this construction, the digital data intelligent memory device and the digital data utilizing device establish the common key information, which enables the two devices to carry out encrypted communication by the common key cipher.

Here, without the key information being transferred between the digital data intelligent memory device and the digital data utilizing device, the key information acquiring unit may acquire the key information by subjecting base data, which is commonly established in the key information acquiring unit and the digital data utilizing device through an exchange of data other than the key information, to a secret data conversion that is also provided in the digital data utilizing device.

With this construction, the digital data intelligent memory device and the digital data utilizing device establish the common key information without transferring the key information itself. Accordingly, the key information can be protected from tapping.

Here, without the key information being transferred between the digital data intelligent memory device and the digital data utilizing device, the key information acquiring unit may acquire the key information by subjecting time-of-day data, which is common in the digital data intelligent memory device and the digital data utilizing device, to a secret data conversion that is also provided in the digital data utilizing device.

With this construction, the common key information is generated from the time-of-day data, which ensures the generation of different key information in each send session.

Here, the digital data intelligent memory device may further include a key information storing unit for storing the key information, wherein in each send session the key information acquiring unit renews the key information stored in the key information storing unit by applying a predetermined conversion to the key information.

With this construction, new key information is generated from preceding key information, which further strengthens the confidentiality of the converted management information in communication.

Here, the predetermined conversion applied to the key information by the key information acquiring unit may be any of: an incrementing; a decrementing; one or a combination of the four arithmetic operations using a predetermined value; and a predetermined secret one-way conversion.

With this construction, the new key information is generated just by performing increment, decrement, one or a combination of the four rules of arithmetic using a predetermined value, or a predetermined secret one-way conversion, on the preceding key information. As a result, the key information generation process becomes easier.

Here, the data converting unit may perform an exclusive-OR operation on the management information and the key information, to generate the converted management information.

With this construction, the XOR operation is employed to convert the management information. Since the inverse of the XOR operation is also the XOR operation, the conversion and inverse conversion process for the management information becomes easier.

Here, the key information acquiring unit may acquire the key information as a public key in a public key cipher, with a private key corresponding to the public key being acquired by the digital data utilizing device, wherein the data converting unit encrypts the management information using the key information according to the public key cipher, to generate the converted management information.

With this construction, the digital data intelligent memory device and the digital data utilizing device respectively acquire the public and private keys, which enables the two devices to carry out encrypted communication by the public key cipher.

Here, the key information acquiring unit may acquire the key information as a private key in a recovery-type signature scheme, with a public key corresponding to the private key being acquired by the digital data utilizing device, wherein the data converting unit encrypts the management information using the key information according to the recovery-type signature scheme, to generate the converted management information.

With this construction, the digital data intelligent memory device and the digital data utilizing device respectively acquire the private and public keys, which enables the two devices to carry out encrypted communication by the recovery-type signature scheme.

Here, the data converting unit may generate a random number in each send session, and, having added the generated random number to a predetermined position in the management information, perform the data conversion on the management information.

With this construction, the random number is added to the predetermined position in the management information prior to the data conversion, so that the confidentiality of the converted management information in communication is more strengthened.

To achieve the stated object, the invention also provides a digital data intelligent memory device for receiving from a digital data recording device digital data and management information that contains information for restricting the use of the digital data, and storing the digital data and the management information, including: a key information acquiring unit for acquiring key information which differs in each receive session; a receiving unit for receiving, from the digital data recording device, the digital data and the management information which has been converted in such a manner as to enable the digital data intelligent memory device to restore the management information from the converted management information by an inverse data conversion specified by the acquired key information; an inverse data converting unit for performing the inverse data conversion on the converted management information received by the receiving unit, to restore the management information; a management information storing unit for storing the management information restored by the inverse data converting unit; and a digital data storing unit for storing the digital data received by the receiving unit.

With this construction, the digital data intelligent memory device receives the converted management information from the digital data recording device, inverse converts the converted management information based on the key information which differs in each receive session, and stores the generated management information. Accordingly, even when the converted management information is backup copied in an earlier session and replaced with the backup copy in a later session without authorization, the backup copy is useless, as it cannot be inverse converted properly with key information of the later session.

Here, the key information acquiring unit may acquire the key information as a common key in a common key cipher, the key information being also acquired by the digital data recording device, wherein the inverse data converting unit decrypts the converted management information using the key information according to the common key cipher, to restore the management information.

With this construction, the digital data intelligent memory device and the digital data recording device establish the common key information, which enables the two devices to carry out encrypted communication by the common key cipher.

Here, without the key information being transferred between the digital data intelligent memory device and the digital data recording device, the key information acquiring unit may acquire the key information by subjecting base data, which is commonly established in the key information acquiring unit and the digital data recording device through an exchange of data other than the key information, to a secret data conversion that is also provided in the digital data recording device.

With this construction, the digital data intelligent memory device and the digital data recording device establish the common key information without transferring the key information itself, so that the key information is protected from tapping.

Here, without the key information being transferred between the digital data intelligent memory device and the digital data recording device, the key information acquiring unit may acquire the key information by subjecting time-of-day data, which is common in the digital data intelligent memory device and the digital data recording device, to a secret data conversion that is also provided in the digital data recording device.

With this construction, the common key information is generated from the time-of-day data, which ensures the generation of different key information in each receive session.

Here, the digital data intelligent memory device may further include a key information storing unit for storing the key information, wherein in each receive session the key information acquiring unit renews the key information stored in the key information storing unit by applying a predetermined conversion to the key information.

With this construction, new key information is generated from preceding key information, which further strengthens the confidentiality of the converted management information in communication.

Here, the predetermined conversion applied to the key information by the key information acquiring unit may be any of: an incrementing; a decrementing; one or a combination of the four arithmetic operations using a predetermined value; and a predetermined secret one-way conversion.

With this construction, the new key information is generated merely by performing increment, decrement, one or a combination of the four rules of arithmetic using a predetermined value, or a predetermined secret one-way conversion, on the preceding key information. As a result, the key information generation process becomes easier.

Here, the inverse data converting unit may perform an exclusive-OR operation on the converted management information and the key information, to restore the management information.

With this construction, the XOR operation is employed to convert the management information. Since the inverse of the XOR operation is the XOR operation, the conversion and inverse conversion process for the management information becomes easier.

Here, the key information acquiring unit may acquire the key information as a private key in a public key cipher, with a public key corresponding to the private key being acquired by the digital data recording device, wherein the inverse data converting unit decrypts the converted management information using the key information according to the public key cipher, to restore the management information.

With this construction, the digital data intelligent memory device and the digital data recording device respectively acquire the private and public keys, which enables the two devices to carry out encrypted communication by the public key cipher.

Here, the key information acquiring unit may acquire the key information as a public key in a recovery-type signature scheme, with a private key corresponding to the public key being acquired by the digital data recording device, wherein the inverse data converting unit decrypts the converted management information using the key information according to the recovery-type signature scheme, to restore the management information.

With this construction, the digital data intelligent memory device and the digital data recording device respectively acquire the public and private keys, which enables the two devices to carry out encrypted communication by the recovery-type signature scheme.

Here, the receiving unit may receive the converted management information in which a random number has been added to a predetermined position prior to the conversion, wherein the inverse data converting unit performs the inverse data conversion on the converted management information and then removes the random number from the predetermined position in the inverse converted management information, to restore the management information.

With this construction, the random number is added to the predetermined position in the management information prior to the data conversion, so that the confidentiality of the converted management information in communication is more strengthened.

To achieve the stated object, the invention also provides a digital data utilizing device for receiving from a digital data intelligent memory device digital data and management information that contains restrictive information for restricting the use of the digital data, and utilizing the digital data and the management information, including: a key information acquiring unit for acquiring key information which differs in each receive session; a receiving unit for receiving, from the digital data intelligent memory device, the digital data and the management information which has been converted in such a manner as to enable the digital data utilizing device to restore the management information from the converted management information by an inverse data conversion specified by the acquired key information; an inverse data converting unit for performing the inverse data conversion on the converted management information received by the receiving unit, to restore the management information; and a utilizing unit for utilizing the digital data received by the receiving unit, in accordance with the restrictive information contained in the restored management information.

With this construction, the digital data utilizing device receives the converted management information from the digital data intelligent memory device, inverse converts the converted management information based on the key information which differs in each receive session, and utilizes the generated management information. Accordingly, even when the converted management information is backup copied in an earlier session and replaced with the backup copy in a later session without authorization, the backup copy is useless, as it cannot be inverse converted properly with key information of the later session.

Here, the key information acquiring unit may acquire the key information as a common key in a common key cipher, the key information being also acquired by the digital data intelligent memory device, wherein the inverse data converting unit decrypts the converted management information using the key information according to the common key cipher, to restore the management information.

With this construction, the digital data utilizing device and the digital data intelligent memory device establish the common key information, which enables the two devices to carry out encrypted communication by the common key cipher.

Here, without the key information being transferred between the digital data utilizing device and the digital data intelligent memory device, the key information acquiring unit may acquire the key information by subjecting base data, which is commonly established in the key information acquiring unit and the digital data intelligent memory device through an exchange of data other than the key information, to a secret data conversion that is also provided in the digital data intelligent memory device.

With this construction, the digital data utilizing device and the digital data intelligent memory device establish the common key information without transferring the key information itself, so that the key information is protected from tapping.

Here, without the key information being transferred between the digital data utilizing device and the digital data intelligent memory device, the key information acquiring unit may acquire the key information by subjecting time-of-day data, which is common in the digital data utilizing device and the digital data intelligent memory device, to a secret data conversion that is also provided in the digital data intelligent memory device.

With this construction, the common key information is generated from the time-of-day data, which ensures the generation of different key information in each receive session.

Here, the digital data utilizing device may further include a key information storing unit for storing the key information, wherein in each receive session the key information acquiring unit renews the key information stored in the key information storing unit by applying a predetermined conversion to the key information.

With this construction, new key information is generated from preceding key information, with it being possible to further strengthen the confidentiality of the converted management information in communication.

Here, the predetermined conversion applied to the key information by the key information acquiring unit may be any of: an incrementing; a decrementing; one or a combination of the four arithmetic operations using a predetermined value; and a predetermined secret one-way conversion.

With this construction, the new key information is generated merely by performing increment, decrement, one or a combination of the four rules of arithmetic using a predetermined value, or a predetermined secret one-way conversion, on the preceding key information. As a result, the key information generation process becomes easier.

Here, the inverse data converting unit may perform an exclusive-OR operation on the converted management information and the key information, to restore the management information.

With this construction, the XOR operation is employed to convert the management information. Since the inverse of the XOR operation is the XOR operation, the conversion and inverse conversion process for the management information becomes easier.

Here, the key information acquiring unit may acquire the key information as a private key in a public key cipher, with a public key corresponding to the private key being acquired by the digital data intelligent memory device, wherein the inverse data converting unit decrypts the converted management information using the key information according to the public key cipher, to restore the management information.

With this construction, the digital data utilizing device and the digital data intelligent memory device respectively acquire the private and public keys, which enables the two devices to carry out encrypted communication by the public key cipher.

Here, the key information acquiring unit may acquire the key information as a public key in a recovery-type signature scheme, with a private key corresponding to the public key being acquired by the digital data intelligent memory device, wherein the inverse data converting unit decrypts the converted management information using the key information according to the recovery-type signature scheme, to restore the management information.

With this construction, the digital data utilizing device and the digital data intelligent memory device respectively acquire the public and private keys, which enables the two devices to carry out encrypted communication by the recovery-type signature scheme.

Here, the receiving unit may receive the converted management information in which a random number has been added to a predetermined position prior to the conversion, wherein the inverse data converting unit performs the inverse data conversion on the converted management information and then removes the random number from the predetermined position in the inverse converted management information, to restore the management information.

With this construction, the random number is added to the predetermined position in the management information prior to the data conversion, so that the confidentiality of the converted management information in communication is more strengthened.

To achieve the stated object, the invention also provides a digital data recording device for sending digital data and management information that contains information for restricting the use of the digital data, to a digital data intelligent memory device, including: a management information acquiring unit for acquiring the management information; a digital data acquiring unit for acquiring the digital data; a key information acquiring unit for acquiring key information which differs in each send session; a data converting unit for performing a data conversion specified by the acquired key information, on the management information acquired by the management information acquiring unit, to generate converted management information; and a sending unit for sending the digital data acquired by the digital data acquiring unit and the converted management information generated by the data converting unit, to the digital data intelligent memory device.

With this construction, the digital data recording device converts the acquired management information based on the key information which differs in each send session, before sending it to the digital data intelligent memory device. Accordingly, even when the converted management information is backup copied in an earlier session and replaced with the backup copy in a later session without authorization, the backup copy is useless, as it cannot be inverse converted properly with key information of the later session.

Here, the key information acquiring unit may acquire the key information as a common key in a common key cipher, the key information being also acquired by the digital data intelligent memory device, wherein the data converting unit encrypts the management information using the key information according to the common key cipher, to generate the converted management information.

With this construction, the digital data recording device and the digital data intelligent memory device establish the common key information, which enables the two devices to carry out encrypted communication by the common key cipher.

Here, without the key information being transferred between the digital data recording device and the digital data intelligent memory device, the key information acquiring unit may acquire the key information by subjecting base data, which is commonly established in the key information acquiring unit and the digital data intelligent memory device through an exchange of data other than the key information, to a secret data conversion that is also provided in the digital data intelligent memory device.

With this construction, the digital data recording device and the digital data intelligent memory device establish the common key information without transferring the key information itself, so that the key information is protected from tapping.

Here, without the key information being transferred between the digital data recording device and the digital data intelligent memory device, the key information acquiring unit may acquire the key information by subjecting time-of-day data, which is common in the digital data recording device and the digital data intelligent memory device, to a secret data conversion that is also provided in the digital data intelligent memory device.

With this construction, the key information is generated from the time-of-day data, which ensures the generation of different key information in each send session.

Here, the digital data recording device may further include a key information storing unit for storing the key information, wherein in each send session the key information acquiring unit renews the key information stored in the key information storing unit by applying a predetermined conversion to the key information.

With this construction, new key information is generated from preceding key information, with it being possible to further strengthen the confidentiality of the converted management information in communication.

Here, the predetermined conversion applied to the key information by the key information acquiring unit may be any of: an incrementing; a decrementing; one or a combination of the four arithmetic operations using a predetermined value; and a predetermined secret one-way conversion.

With this construction, the new key information is generated merely by performing increment, decrement, one or a combination of the four rules of arithmetic using a predetermined value, or a predetermined secret one-way conversion, on the preceding key information. As a result, the key information generation process becomes easier.

Here, the data converting unit may perform an exclusive-OR operation on the management information and the key information, to generate the converted management information.

With this construction, the XOR operation is used to convert the management information. Since the inverse of the XOR operation is the XOR operation, the conversion and inverse conversion process for the management information becomes easier.

Here, the key information acquiring unit may acquire the key information as a public key in a public key cipher, with a private key corresponding to the public key being acquired by the digital data intelligent memory device, wherein the data converting unit encrypts the management information using the key information according to the public key cipher, to generate the converted management information.

With this construction, the digital data recording device and the digital data intelligent memory device respectively acquire the public and private keys, which enables the two devices to carry out encrypted communication by the public key cipher.

Here, the key information acquiring unit may acquire the key information as a private key in a recovery-type signature scheme, with a public key corresponding to the private key being acquired by the digital data intelligent memory device, wherein the data converting unit encrypts the management information using the key information according to the recovery-type signature scheme, to generate the converted management information.

With this construction, the digital data recording device and the digital data intelligent memory device respectively acquire the private and public keys, which enables the two devices to carry out encrypted communication by the recovery-type signature scheme.

Here, the data converting unit may generate a random number in each send session, and, having added the generated random number to a predetermined position in the management information, perform the data conversion on the management information.

With this construction, the random number is added to the predetermined position in the management information prior to the data conversion, so that the confidentiality of the converted management information in communication is more strengthened.

To achieve the stated object, the invention also provides an encrypted digital data intelligent memory device for sending encrypted digital data and encrypted management information to an encrypted digital data utilizing device, the encrypted management information having been generated by encrypting management information in such a manner that the encrypted management information can be decrypted based on a device ID uniquely given to the encrypted digital data intelligent memory device, the management information containing information for decrypting the encrypted digital data into digital data and information for restricting the use of the digital data,, the encrypted digital data intelligent memory device including: a device ID holding unit for holding the device ID; a device ID providing unit for providing the encrypted digital data utilizing device with the device ID held in the device ID holding unit; an encrypted management information storing unit for storing the encrypted management information; an encrypted digital data storing unit for storing the encrypted digital data; a key information acquiring unit for acquiring key information which differs in each send session; a data converting unit for performing a data conversion specified by the acquired key information, on the encrypted management information stored in the encrypted management information storing unit, to generate converted management information; and a sending unit for sending the encrypted digital data stored in the encrypted digital data storing unit and the converted management information generated by the data converting unit, to the encrypted digital data utilizing device.

With this construction, the encrypted digital data intelligent memory device converts, based on the key information which differs in each send session, such encrypted management information that can be decrypted based on the device ID of the encrypted digital data intelligent memory device, before sending it to the encrypted digital data utilizing device. Accordingly, even if the converted management information is backup copied in an earlier session and replaced with the backup copy in a later session without authorization, the backup copy cannot be inverse converted properly with key information of the later session. Also, even if the converted management information and encrypted digital data which are being sent from the encrypted digital data intelligent memory device to the encrypted digital data utilizing device are unauthorizedly copied to another encrypted digital data intelligent memory device, the copied information and data cannot be decrypted because a device ID of the latter intelligent memory device is different from that of the former intelligent memory device.

To achieve the stated object, the invention also provides an encrypted digital data intelligent memory device for receiving encrypted digital data and encrypted management information from an encrypted digital data recording device and storing the encrypted digital data and the encrypted management information, the encrypted management information having been generated by encrypting management information in such a manner that the encrypted management information can be decrypted based on a device ID uniquely given to the encrypted digital data intelligent memory device, the management information containing information for decrypting the encrypted digital data into digital data and information for restricting the use of the digital data, the encrypted digital data intelligent memory device including: a device ID holding unit for holding the device ID; a device ID providing unit for providing the encrypted digital data recording device with the device ID held in the device ID holding unit; a key information acquiring unit for acquiring key information which differs in each receive session; a receiving unit for receiving, from the encrypted digital data recording device, the encrypted digital data and the encrypted management information which has been converted in such a manner as to enable the encrypted digital data intelligent memory device to restore the encrypted management information from the converted management information by an inverse data conversion specified by the acquired key information; an inverse data converting unit for performing the inverse data conversion on the converted management information received by the receiving unit, to restore the encrypted management information; an encrypted management information storing unit for storing the encrypted management information restored by the inverse data converting unit; and an encrypted digital data storing unit for storing the encrypted digital data received by the receiving unit.

With this construction, the encrypted digital data intelligent memory device receives the converted management information from the encrypted digital data recording device, inverse converts the converted management information based on the key information which differs in each receive session, and as a result obtains and stores such encrypted management information that can be decrypted based on the device ID of the encrypted digital data intelligent memory device. Accordingly, even if the converted management information is backup copied in an earlier session and replaced with the backup copy in a later session without authorization, the backup copy cannot be inverse converted properly with key information of the later session. Also, even if the converted management information and encrypted digital data which are being sent from the encrypted digital data recording device to the encrypted digital data intelligent memory device are unauthorizedly copied to another encrypted digital data intelligent memory device, the copied information and data cannot be decrypted because a device ID of the latter intelligent memory device is different from that of the former intelligent memory device.

To achieve the stated object, the invention also provides an encrypted digital data utilizing device for receiving encrypted digital data and encrypted management information from an encrypted digital data intelligent memory device and utilizing the encrypted digital data and the encrypted management information, the encrypted management information having been generated by encrypting management information in such a manner that the encrypted management information can be decrypted based on a device ID uniquely given to the encrypted digital data intelligent memory device, the management information containing decryption information for decrypting the encrypted digital data into digital data and restrictive information for restricting the use of the digital data, the encrypted digital data utilizing device including: a device ID acquiring unit for acquiring the device ID from the encrypted digital data intelligent memory device; a key information acquiring unit for acquiring key information which differs in each receive session; a receiving unit for receiving, from the encrypted digital data intelligent memory device, the encrypted digital data and the encrypted management information which has been converted in such a manner as to enable the encrypted digital data utilizing device to restore the encrypted management information from the converted management information by an inverse data conversion specified by the acquired key information; an inverse data converting unit for performing the inverse data conversion on the converted management information received by the receiving unit, to restore the encrypted management information; a management information decrypting unit for performing decryption specified by the acquired device ID, on the encrypted management information restored by the inverse data converting unit, to obtain the management information; a digital data decrypting unit for performing decryption specified by the decryption information contained in the management information obtained by the management information decrypting unit, on the encrypted digital data received by the receiving unit, to obtain the digital data; and a utilizing unit for utilizing the digital data in accordance with the restrictive information contained in the management information.

With this construction, the encrypted digital data utilizing device receives the converted management information from the encrypted digital data intelligent memory device, inverse converts the converted management information based on the key information which differs in each receive session, and further decrypts the encrypted management information generated by the inverse data conversion based on the device ID of the encrypted digital data intelligent memory device, as a result of which the management information is obtained and put to use. Accordingly, even if the converted management information is backup copied in an earlier session and replaced with the backup copy in a later session without authorization, the backup copy cannot be inverse converted properly with key information of the later session. Also, even if the converted management information and encrypted digital data which are being sent from the encrypted digital data intelligent memory device to the encrypted digital data utilizing device are unauthorizedly copied to another encrypted digital data intelligent memory device, the copied information and data cannot be decrypted because a device ID of the latter intelligent memory device is different from that of the former intelligent memory device.

To achieve the stated object, the invention also provides an encrypted digital data recording device for encrypting digital data and management information that contains decryption information for decrypting the encrypted digital data into the digital data and restrictive information for restricting the use of the digital data, in such a manner that the encrypted management information can be decrypted based on a device ID uniquely given to an encrypted digital data intelligent memory device and the encrypted digital data can be decrypted based on the decryption information, and sending the encrypted digital data and the encrypted management information to the encrypted digital data intelligent memory device, the encrypted digital data recording device including: a device ID receiving unit for receiving the device ID from the encrypted digital data intelligent memory device; a management information acquiring unit for acquiring the management information; a digital data acquiring unit for acquiring the digital data; a key information acquiring unit for acquiring key information which differs in each send session; a management information encrypting unit for encrypting the acquired management information in such a manner that the encrypted management information can be decrypted based on the device ID; a data converting unit for performing a data conversion specified by the acquired key information, on the encrypted management information generated by the management information encrypting unit, to generate converted management information; a digital data encrypting unit for encrypting the acquired digital data in such a manner that the encrypted digital data can be decrypted based on the decryption information; and a sending unit for sending the encrypted digital data generated by the digital data encrypting unit and the converted management information generated by the data converting unit, to the encrypted digital data intelligent memory device.

With this construction, the encrypted digital data recording device encrypts the acquired management information such that the encrypted management information can be decrypted based on the device ID of the encrypted digital data intelligent memory device, and further converts the encrypted management information based on the key information which differs in each send session, before sending it to the encrypted digital data intelligent memory device. Accordingly, even if the converted management information is backup copied in an earlier session and replaced with the backup copy in a later session without authorization, the backup copy cannot be inverse converted properly with key information of the later session. Also, even if the converted management information and encrypted digital data which are being sent from the encrypted digital data recording device to the encrypted digital data intelligent memory device are copied to another encrypted digital data intelligent memory device, the copied information and data cannot be decrypted because a device ID of the latter intelligent memory device is different from that of the former intelligent memory device.

To achieve the stated object, the invention also provides a digital data utilizing method for receiving from a digital data intelligent memory device digital data and management information that contains restrictive information for restricting the use of the digital data, and utilizing the digital data and the management information in a digital data utilizing device, the digital data utilizing method including: a key information generating step for generating, in each utilize session, conversion key information for specifying a data conversion in the digital data intelligent memory device, and concurrently generating inverse conversion key information for specifying an inverse of the data conversion in the digital data utilizing device; a data converting step for performing the data conversion specified by the conversion key information, on the management information stored in the digital data intelligent memory device, to generate converted management information; a converted management information sending step for sending the converted management information from the digital data intelligent memory device to the digital data utilizing device; a receiving step for receiving the converted management information in the digital data utilizing device from the digital data intelligent memory device; an inverse data converting step for performing the inverse data conversion specified by the inverse conversion key information, on the converted management information received in the digital data utilizing device, to restore the management information; a digital data sending step for sending the digital data stored in the digital data intelligent memory device, to the digital data utilizing device; a digital data receiving step for receiving the digital data in the digital data utilizing device from the digital data intelligent memory device; and a digital data utilizing step for utilizing the digital data received in the digital data utilizing device, in accordance with the restrictive information contained in the restored management information.

With this construction, the digital data intelligent memory device converts the management information based on the conversion key information which differs in each utilize session, and sends the converted management information to the digital data utilizing device. The digital data utilizing device inverse converts the converted management information based on the inverse conversion key information which differs in each utilize session, to thereby obtain and utilize the management information. Accordingly, even if the converted management information is backup copied in an earlier session and replaced with the backup copy in a later session without authorization, the backup copy cannot be inverse converted properly with key information of the later session.

To achieve the stated object, the invention also provides a digital data recording method for sending, from a digital data recording device to a digital data intelligent memory device, digital data and management information that contains information for restricting the use of the digital data, and recording the digital data and the management information into the digital data intelligent memory device, the digital data recording method including: a key information generating step for generating, in each record session, conversion key information for specifying a data conversion in the digital data recording device, and concurrently generating inverse conversion key information for specifying an inverse of the data conversion in the digital data intelligent memory device; a management information acquiring step for acquiring the management information in the digital data recording device; a data converting step for performing the data conversion specified by the conversion key information, on the management information acquired in the digital data recording device, to generate converted management information; a converted management information sending step for sending the converted management information from the digital data recording device to the digital data intelligent memory device; a converted management information receiving step for receiving the converted management information in the digital data intelligent memory device from the digital data recording device; an inverse data converting step for performing the inverse data conversion specified by the inverse conversion key information, on the converted management information received in the digital data intelligent memory device, to restore the management information; a management information storing step for storing the restored management information in the digital data intelligent memory device; a digital data acquiring step for acquiring the digital data in the digital data recording device; a digital data sending step for sending the digital data from the digital data recording device to the digital data intelligent memory device; a digital data receiving step for receiving the digital data in the digital data intelligent memory device from the digital data recording device; and a digital data storing step for storing the received digital data in the digital data intelligent memory device.

With this construction, the digital data recording device converts the management information based on the conversion key information which differs in each record session, and sends the converted management information to the digital data intelligent memory device. The digital data intelligent memory device inverse converts the converted management information based on the inverse conversion key information which differs in each record session, to thereby obtain and store the management information. Accordingly, even when the converted management information is backup copied in an earlier session and replaced with the backup copy in a later session without authorization, the backup copy cannot be inverse converted properly with key information of the later session.

To achieve the stated object, the invention also provides a computer-readable storage medium storing a digital data utilizing program for receiving from a digital data intelligent memory device digital data and management information that contains information for restricting the use of the digital data, and utilizing the digital data and the management information, the digital data utilizing program including: a key information acquiring step for acquiring key information which differs in each receive session; a receiving step for receiving, from the digital data intelligent memory device, the digital data and the management information which has been converted so that the management information can be restored from the converted management information by an inverse data conversion specified by the acquired key information; an inverse data converting step for performing the inverse data conversion on the converted management information received in the receiving step, to restore the management information; and a utilizing step for utilizing the digital data received in the receiving step, in accordance with the restrictive information contained in the restored management information.

With this construction, the converted management information received from the digital data intelligent memory device is inverse converted based on the key information which differs in each receive session, as a result of which the management information is obtained and put to use. Accordingly, even if the converted management information is backup copied in an earlier session and replaced with the backup copy in a later session without authorization, the backup copy cannot be inverse converted properly with key information of the later session.

To achieve the stated object, the invention also provides a computer-readable storage medium storing a digital data recording program for sending to a digital data intelligent memory device digital data and management information that contains information for restricting the use of the digital data, and recording the digital data and the management information into the digital data intelligent memory device, the digital data recording program including: a management information acquiring step for acquiring the management information; a digital data acquiring step for acquiring the digital data; a key information acquiring step for acquiring key information which differs in each send session; a data converting step for performing a data conversion specified by the acquired key information, on the management information acquired in the management information acquiring step, to generate converted management information; and a sending step for sending the digital data acquired in the digital data acquiring step and the converted management information generated in the data converting step, to the digital data intelligent memory device.

With this construction, the acquired management information is converted based on the key information which differs in each send session, before being sent to the digital data intelligent memory device. Accordingly, even if the converted management information is backup copied in an earlier session and replaced with the backup copy in a later session without authorization, the backup copy cannot be inverse converted properly with key information of the later session.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 7 is a flowchart showing the operation of reading encrypted digital content from the memory card and utilizing it in the player, according to the embodiment.

DESCRIPTION OF THE PREFERRED EMBODIMENT(S)

(Overview)

The present invention is embodied as follows. To write digital content from a recorder onto a memory card, first the memory card sends its card ID to the recorder, and then a common key is established between the recorder and the memory card. Next, the recorder encrypts management information containing restrictive information and a content key using the received card ID as an encryption key, and further performs a data conversion on the encrypted management information using the common key to generate converted management information. The recorder also encrypts the digital content using the content key contained in the management information, and outputs the converted management information and the encrypted digital content to the memory card. The memory card performs the inverse of the data conversion on the converted management information using the common key to restore the encrypted management information, and stores the encrypted management information and the encrypted digital content therein.

On the other hand, to read the digital content from the memory card into a player, first the memory card sends its card ID to the player, and a common key is established between the memory card and the player. Next, the memory card performs a data conversion on the encrypted management information stored therein using the common key, and sends the converted management information and the encrypted digital content stored therein to the player. The player performs the inverse of the data conversion on the converted management information using the common key to restore the encrypted management information, and decrypts the encrypted management information using the received card ID as a decryption key. Lastly, in accordance with digital content usage restrictions set by the restrictive information in the decrypted management information, the player decrypts the encrypted digital content using the content key contained in the management information, as a result of which the digital content is obtained.

By such converting the management information containing the restrictive information through the use of a different key in each send/receive session, an unauthorized act of backup copying the management information and replacing the management information with the backup copy in subsequent use can be prevented.

(Constructions)

Figure 1:
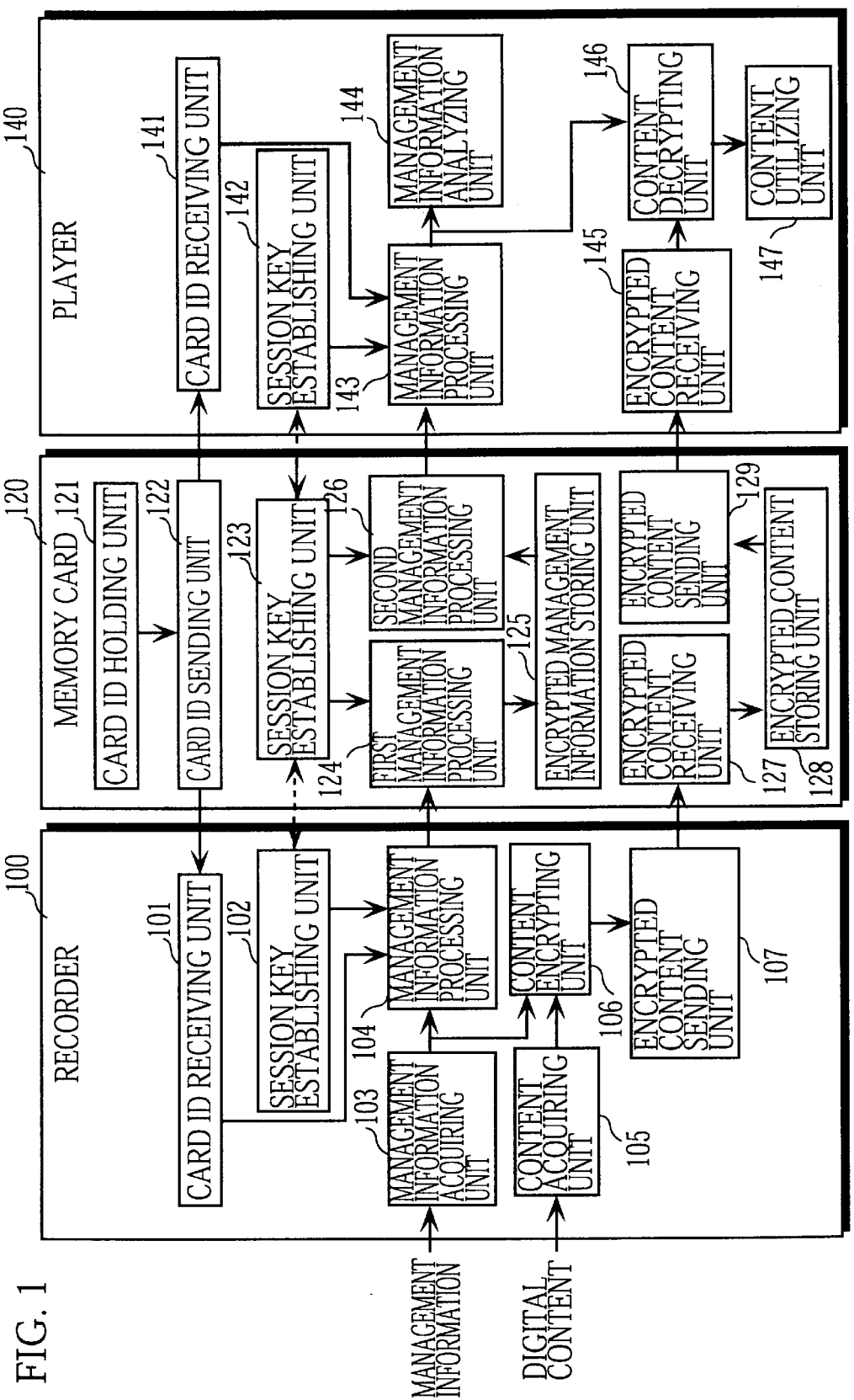
FIG. 1 shows the constructions of a recorder, memory card, and player according to an embodiment of the invention.

FIG. 1 shows the constructions of a recorder 100, memory card 120, and player 140 according to the embodiment of the invention. Note that it is also common to integrate the recorder 100 and the player 140 as a single unit, or to remove write functions from the memory card 120 to render it a reproduce-only product with store and reproduce functions only.

The recorder 100 acquires digital content, such as music information, and management information for the digital content from an external source, processes the digital content and the management information by encryption and the like for protection against unauthorized acts, and sends them to the memory card 120. The recorder 100 is roughly made up of a card ID receiving unit 101, a session key establishing unit 102, a management information acquiring unit 103, a management information processing unit 104, a content acquiring unit 105, a content encrypting unit 106, and an encrypted content sending unit 107.

The card ID receiving unit 101 receives a card ID, such as an 8-byte card ID "0123456789ABCDEFH", from the memory card 120. In this paragraph and others, the character "H" or alternatively "h" in a data string indicates the associated characters are a hexadecimal, or base-16, representation of a numerical value.

The session key establishing unit 102 exchanges data such as random numbers with the memory card 120, to generate a session key which differs in each session of recording encrypted digital content onto the memory card 120. In this embodiment, the session key establishing unit 102 in the recorder 100 and a session key establishing unit 123 in the memory card 120 generate the same session key in the same manner. To be more specific, in each of the session key establishing units 102 and 123, an 8-byte random number is generated and sent to the other device. Then, each of the session key establishing units 102 and 123 performs a predetermined secret one-way conversion on each of the generated random number and the received random number, takes exclusive-OR (XOR) of the two converted values, and further performs the one-way conversion on the outcome to generate a session key. In so doing, the session key establishing units 102 and 123 can establish the common session key without the session key itself being sent/received. In addition, each of the session key establishing units 102 and 123 sends the one-way conversion result of the received random number back to the other device, and compares the one-way conversion result of the generated random number with a value sent back from the other device. If and only if the two values match, each of the session key establishing units 102 and 123 verifies the other device as authorized, and proceeds to establish the common session key. Suppose the session key establishing unit 102 generates and sends 8-byte random number X to the session key establishing unit 123, and receives 8-byte random number Y from the session key establishing unit 123. Then the session key establishing unit 102 applies the one-way conversion to random number Y and sends the outcome "0011337788CCEEFFH" back to the session key establishing unit 123. The session key establishing unit 102 also applies the one-way conversion to random number X, and compares the outcome "0F0F0F0F0F0F0F0FH" with a value sent back from the session key establishing unit 123. When the two values match, the session key establishing unit 102 verifies the memory card 120 as authorized. Following this, the session key establishing unit 102 XORs the two values "0F0F0F0F0F0F0F0FH" and "0011337788CCEEFFH", and further one-way converts the outcome "0F1E3C7887C3E1F0H", to thereby obtain the session key.

The management information acquiring unit 103 acquires the management information that contains restrictive information and a content key. The restrictive information here is information for restricting the use of the digital content. For instance, the restriction information includes information on the number of times the digital content can be used, which is decremented every time the digital content is used, and information on areas and time periods within which the use of the digital content is allowed. The content key is an encryption key used to encrypt the digital content. For example, 16-byte management information "3333333333333333300000000000000AH" made up of an 8-byte content key "3333333333333333H" and 8-byte restrictive information "000000000000000AH" is acquired by the management information acquiring unit 103.

The management information processing unit 104 uses the card ID received by the card ID receiving unit 101 and the session key generated by the session key establishing unit 102, to encrypt and convert the management information acquired by the management information acquiring unit 103. The management information processing unit 104 then sends the result to the memory card 120.

Figure 2:
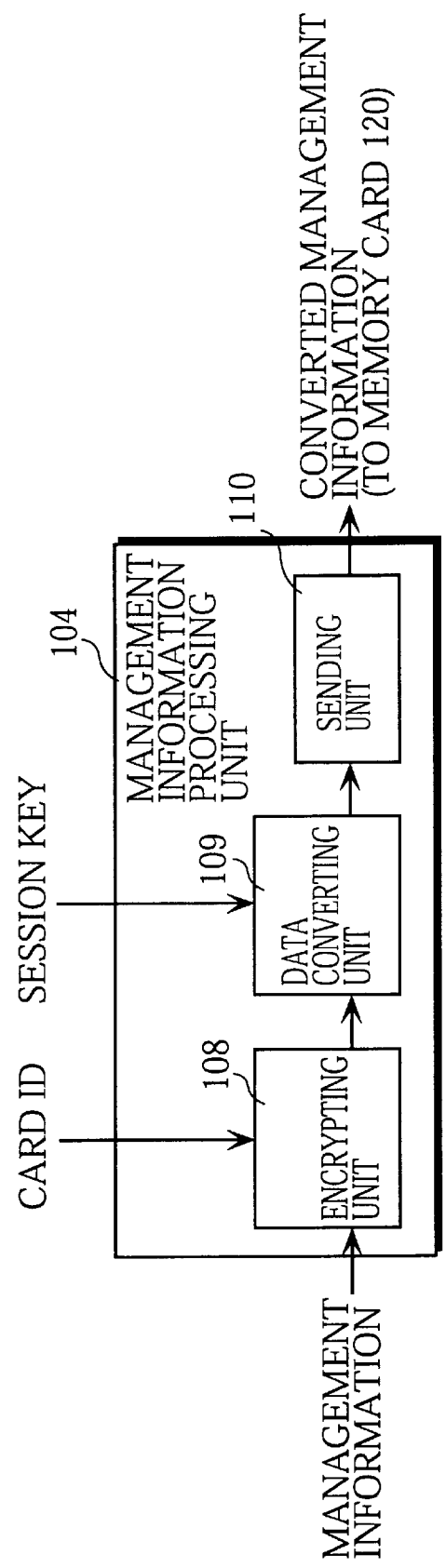
FIG. 2 shows the detailed construction of a management information processing unit 104 shown in FIG. 1.

FIG. 2 shows the detailed construction of the management information processing unit 104.

In the figure, the management information processing unit 104 includes an encrypting unit 108, a data converting unit 109, and a sending unit 110.

The encrypting unit 108 encrypts the management information using the card ID as an encryption key, according to a predetermined algorithm. The predetermined algorithm referred to here is a cipher, such as DES (Data Encryption Standard), that is specified by the encryption key.

The data converting unit 109 performs a predetermined data conversion on the encrypted management information using the session key. The predetermined data conversion here is a cipher specified by the session key. In this embodiment, the XOR operation is employed as the predetermined data conversion, though a cipher such as DES is also applicable.

The sending unit 110 sends the converted management information to the memory card 120.

The content acquiring unit 105 acquires the digital content.

The content encrypting unit 106 encrypts the acquired digital content using the content key included in the management information acquired by the management information acquiring unit 103, according to a predetermined block cipher. In this embodiment, after the digital content is divided into 8-byte blocks, each of the blocks is encrypted using the content key "3333333333333333H", and the encrypted blocks are concatenated to form encrypted digital content.

The encrypted content sending unit 107 sends the encrypted digital content generated by the content encrypting unit 106, to the memory card 120.

The memory card 120 is an intelligent memory device equipped with a large-capacity semiconductor memory for storing encrypted digital content and encrypted management information, and a control circuit for the semiconductor memory. The memory card 120 is roughly made up of a card ID holding unit 121, a card ID sending unit 122, the session key establishing unit 123, a first management information processing unit 124, an encrypted management information storing unit 125, a second management information processing unit 126, an encrypted content receiving unit 127, an encrypted content storing unit 128, and an encrypted content sending unit 129.

The card ID holding unit 121 holds the card ID, such as the 8-byte card ID "0123456789ABCDEFH", which has been uniquely given to the memory card 120.

The card ID sending unit 122 sends the card ID held in the card ID holding unit 121, to the recorder 100 and the player 140.

The session key establishing unit 123 exchanges data such as random numbers with the recorder 100 to generate a session key which differs in each session of recording encrypted digital content onto the memory card 120, and also exchanges data such as random numbers with the player 140 to generate a session key which differs in each session of reading encrypted digital content from the memory card 120. In this embodiment, the session key establishing unit 123 in the memory card 120 generates the same session key as the session key establishing unit 102 in the recorder 100 in the same manner, and generates the same session key as a session key establishing unit 142 in the player 140 in the same manner. This generation of the same session key has already been explained above, so that its detail is omitted here.

The first management information processing unit 124 receives the converted management information from the recorder 100. On this converted management information the first management information processing unit 124 performs the inverse of the predetermined data conversion performed by the data converting unit 109 in the management information processing unit 104 in the recorder 100, using the session key generated by the session key establishing unit 123 through the data exchange with the session key establishing unit 102 in the recorder 100. As a result, the encrypted management information is obtained.

Figure 3:
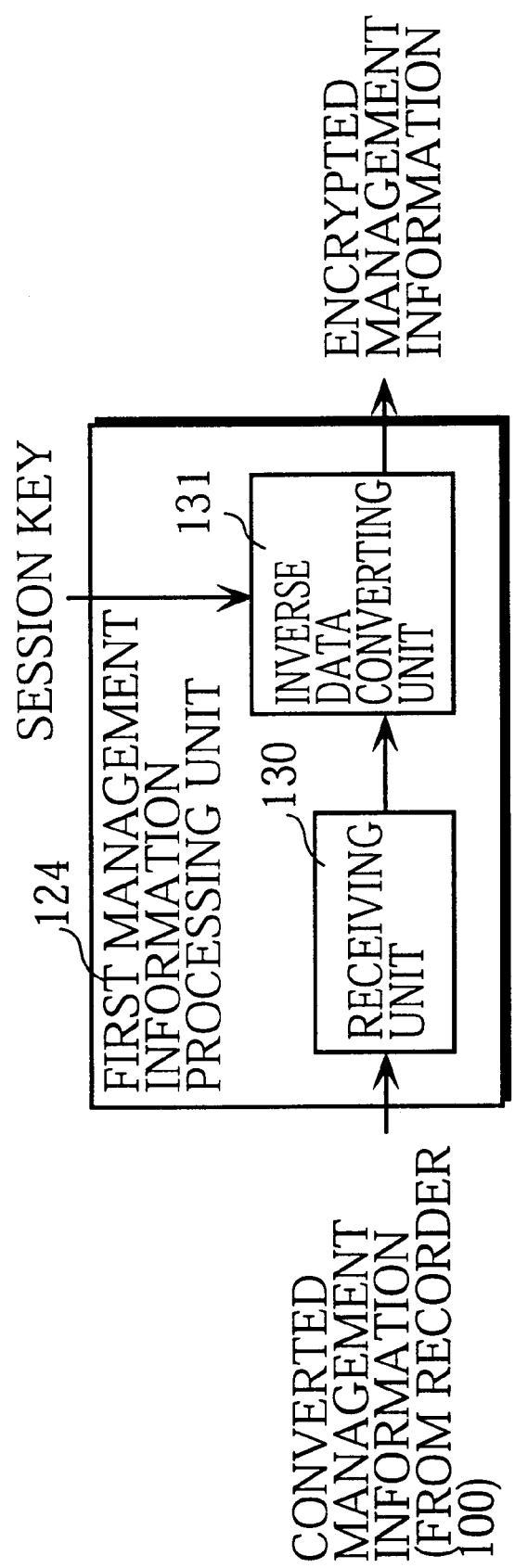
FIG. 3 shows the detailed construction of a first management information processing unit 124 shown in FIG. 1.

FIG. 3 shows the detailed construction of the first management information processing unit 124.

In the figure, the first management information processing unit 124 includes a receiving unit 130 and an inverse data converting unit 131.

The receiving unit 130 receives the converted management information from the sending unit 110 in the management information processing unit 104 in the recorder 100.

The inverse data converting unit 131 performs the inverse of the predetermined data conversion by the data converting unit 109 on the converted management information using the session key shared with the recorder 100, as a result of which the encrypted management information is generated. For example, if the predetermined data conversion by the data converting unit 109 is addition of the session key, the inverse data conversion by the inverse data converting unit 131 is subtraction of the session key. Since this embodiment employs the XOR operation as the predetermined data conversion by the data converting unit 109, the inverse data converting unit 131 performs the XOR operation as the inverse data conversion. Notice that the inverse of XOR is XOR, because XORing a given value twice using the same value yields the original value.

The encrypted management information storing unit 125 stores the encrypted management information generated by the first management information processing unit 124, in its inside nonvolatile memory.

The second management information processing unit 126 performs a predetermined data conversion on the encrypted management information stored in the encrypted management information storing unit 125, using the session key generated by the session key establishing unit 123 through the data exchange with the session key establishing unit 142 in the player 140. The second management information processing unit 126 then sends the converted management information to the player 140.

Figure 4:
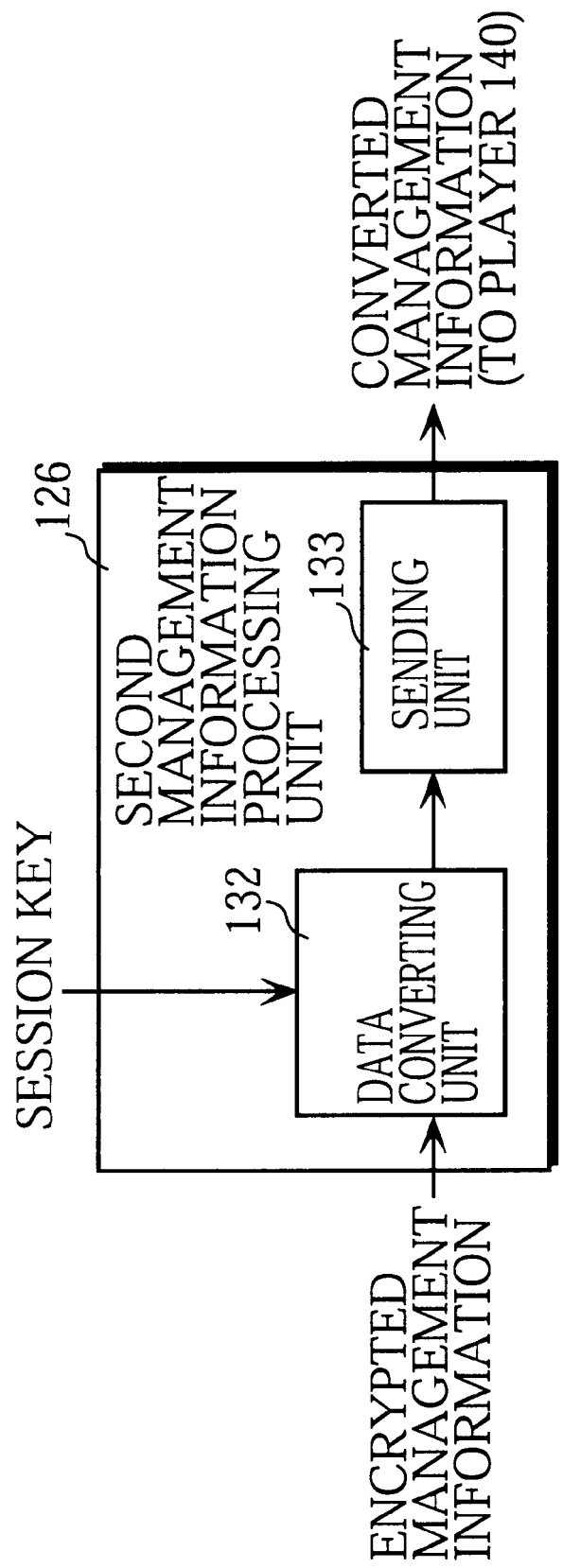
FIG. 4 shows the detailed construction of a second management information processing unit 126 shown in FIG. 1.

FIG. 4 shows the detailed construction of the second management information processing unit 126.

In the figure, the second management information processing unit 126 includes a data converting unit 132 and a sending unit 133.

The data converting unit 132 performs a predetermined data conversion on the encrypted management information using the session key shared with the player 140, to obtain the converted management information. The predetermined data conversion referred to here is a cipher specified by the session key. Like the data converting unit 109, the XOR operation is employed as the predetermined data conversion here, though a cipher such as DES is also applicable.

The sending unit 133 sends the converted management information generated by the data converting unit 132, to the player 140.

The encrypted content receiving unit 127 receives the encrypted digital content from the encrypted content sending unit 107 in the recorder 100.

The encrypted content storing unit 128 stores the encrypted digital content received by the encrypted content receiving unit 127, in its inside nonvolatile memory.

The encrypted content sending unit 129 sends the encrypted digital content stored in the encrypted content storing unit 128, to the player 140.

The player 140 reads digital content such as music information and management information from the memory card 120 in their encrypted state, and utilizes these data by means of reproduction or the like. The player 140 is mainly made up of a card ID receiving unit 141, the session key establishing unit 142, a management information processing unit 143, a management information analyzing unit 144, an encrypted content receiving unit 145, a content decrypting unit 146, and a content utilizing unit 147.

The card ID receiving unit 141 receives the card ID, such as the 8-byte card ID "0123456789ABCDEFH", from the memory card 120.

The session key establishing unit 142 exchanges data such as random numbers with the memory card 120, and so generates a session key which differs in each session of reading encrypted digital content from the memory card 120. As noted above, the session key establishing unit 142 in the player 140 and the session key establishing unit 123 in the memory card 120 generate the same session key in the same manner.

The management information processing unit 143 receives the converted management information from the memory card 120. On this converted management information the management information processing unit 143 first performs the inverse of the predetermined data conversion by the data converting unit 132 in the second management information processing unit 126 in the memory card 120 and then performs decryption, through the use of the session key generated by the session key establishing unit 142 and the card ID received by the card ID receiving unit 141.

Figure 5:
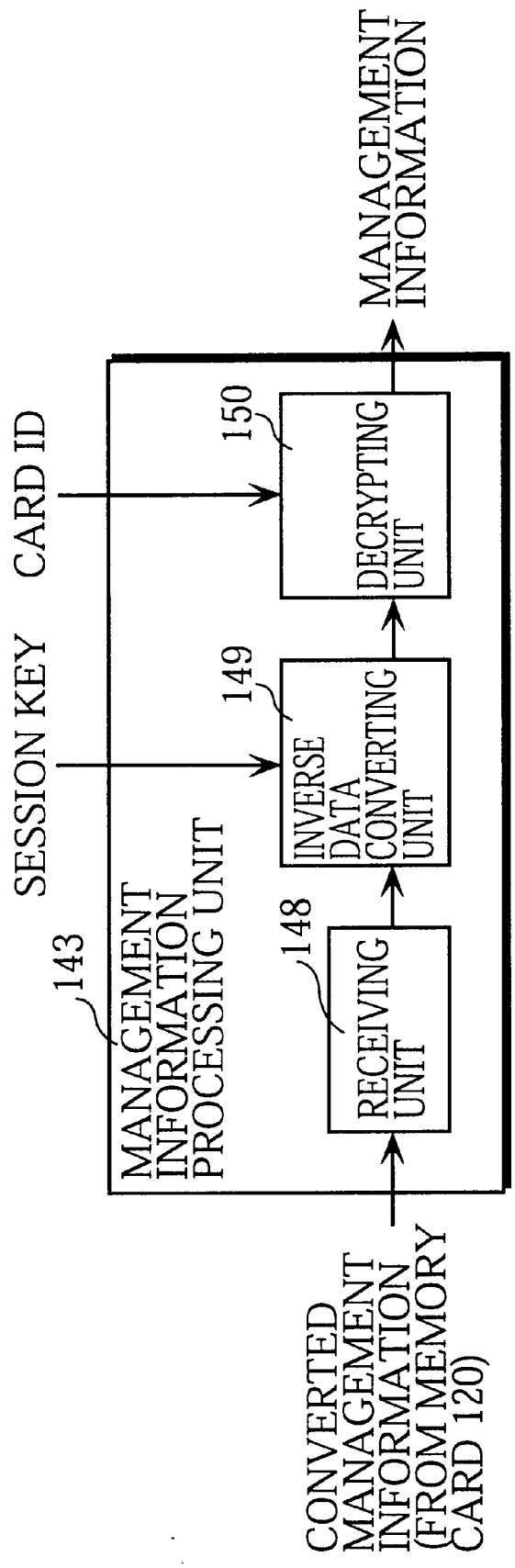
FIG. 5 shows the detailed construction of a management information processing unit 143 shown in FIG. 1.

FIG. 5 shows the detailed construction of the management information processing unit 143.

In the figure, the management information processing unit 143 includes a receiving unit 148, an inverse data converting unit 149, and a decrypting unit 150.

The receiving unit 148 receives the converted management information from the sending unit 133 in the second management information processing unit 126 in the memory card 120.

The inverse data converting unit 149 performs the inverse of the predetermined data conversion by the data converting unit 132 on the converted management information using the session key, to obtain the encrypted management information. In this embodiment, the predetermined data conversion by the data conversion unit 132 is the XOR operation, so that the inverse data conversion by the inverse data converting unit 149 is also the XOR operation.

The decrypting unit 150 decrypts the encrypted management information according to a predetermined algorithm, using the card ID as a decryption key. The predetermined algorithm here is a cipher specified by the decryption key such as DES, and is the inverse of the encryption performed by the encrypting unit 108 in the management information processing unit 104 in the recorder 100.

The management information analyzing unit 144 analyzes the management information generated by the management information processing unit 143, passes the content key included in the management information to the content decrypting unit 146, and controls the use of the digital content in accordance with the restrictive information in the management information. More specifically, if the number of times the digital content can be used is limited to ten, the management information analyzing unit 144 prohibits further use once the digital content has been used ten times. Also, if the time limit for the use of the digital content is set to three weeks, the management information analyzing unit 144 prohibits further use once the three weeks have passed.

The encrypted content receiving unit 145 receives the encrypted digital content from the encrypted content sending unit 129 in the memory card 120.

The content decrypting unit 146 decrypts the encrypted digital content using the content key given from the management information analyzing unit 144, according to the predetermined block cipher. In this embodiment, after the encrypted digital content is divided into 8-byte blocks, each of the blocks is decrypted using the content key "3333333333333333H", and the decrypted blocks are concatenated to form the digital content.

The content utilizing unit 147 utilizes the digital content (e.g. reproduces music) generated by the content decrypting unit 146.

(Operations)

The following is an explanation on how the recorder 100 and the memory card 120 operate to record encrypted digital content.

Figure 6:
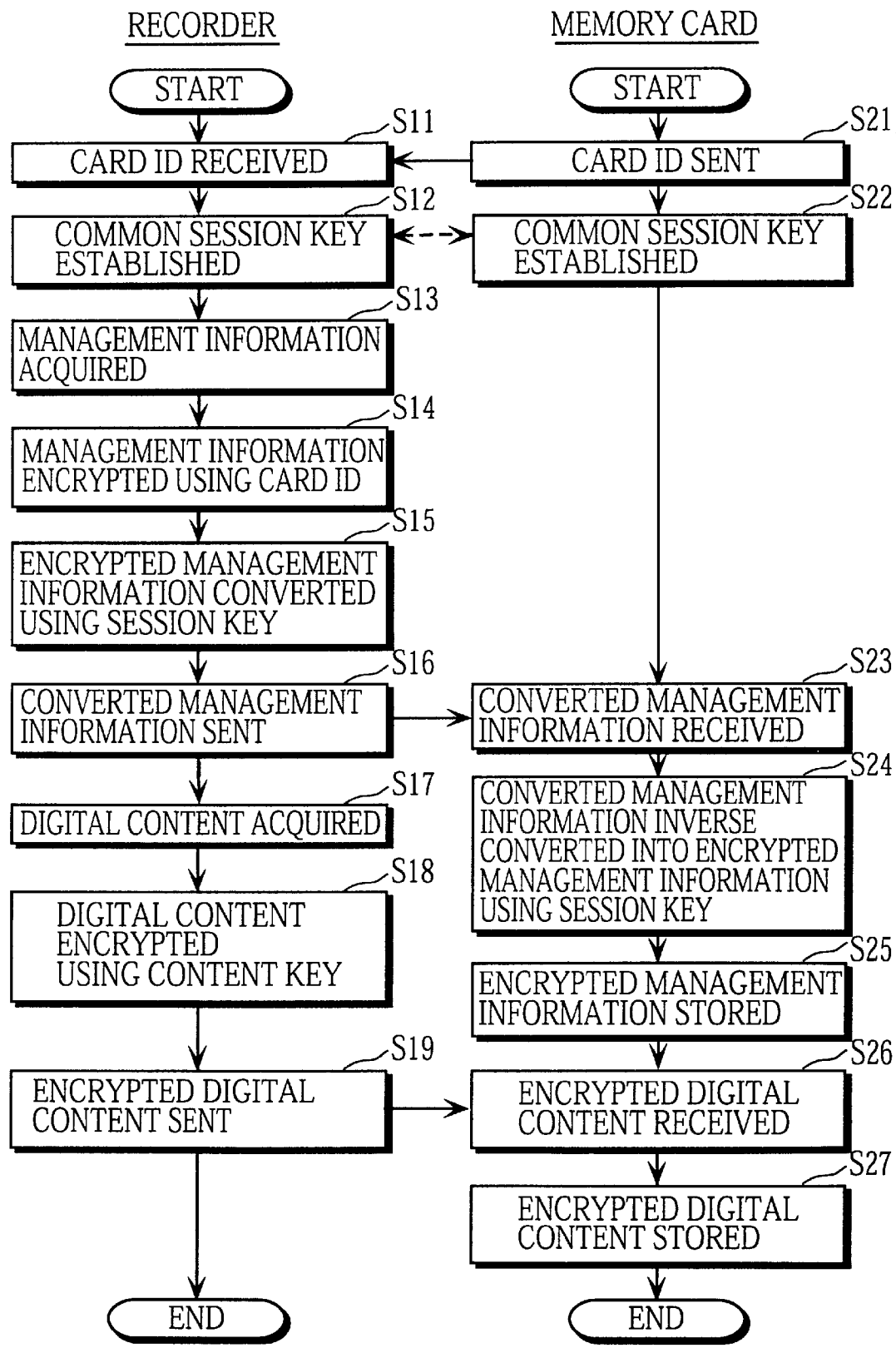
FIG. 6 is a flowchart showing the operation of recording encrypted digital content from the recorder onto the memory card, according the embodiment.

FIG. 6 is a flowchart showing the example operations of the recorder 100 and memory card 120 when recording encrypted digital content.

(1) First, the card ID sending unit 122 in the memory card 120 sends a card ID "CID" held in the card ID holding unit 121, to the recorder 100 (S21). In the present example, the 8-byte card ID "0123456789ABCDEFH" is sent to the recorder 100.

(2) The card ID receiving unit 101 in the recorder 100 receives the card ID "CID" from the memory card 120 (S11).

(3) The session key establishing unit 102 in the recorder 100 and the session key establishing unit 123 in the memory card 120 exchange data such as random numbers, to establish a common session key "SK1" which differs in each session of recording encrypted digital content onto the memory card 120 (S12, S22). In the present example, the session key establishing unit 102 generates and sends 8-byte random number X to the session key establishing unit 123, and receives 8-byte random number Y from the session key establishing unit 123. The session key establishing unit 102 then one-way converts random number Y and sends the outcome "0011337788CCEEFFH" back to the session key establishing unit 123. The session key establishing unit 102 also one-way converts random number X, and compares the outcome "0F0F0F0F0F0F0F0FH" with a value sent back from the session key establishing unit 123. If they match, the session key establishing unit 102 verifies the memory card 120 as authorized. Accordingly, the session key establishing unit 102 XORs the two values "0F0F0F0F0F0F0F0FH" and "0011337788CCEEFFH" and further one-way converts the outcome "0F1E3C7887C3E1F0H" to generate a common session key. Meanwhile, the session key establishing unit 123 generates and sends 8-byte random number Y to the session key establishing unit 102, and receives 8-byte random number X from the session key establishing unit 102. The session key establishing unit 123 then one-way converts random number X and sends the outcome "0F0F0F0F0F0F0F0FH" back to the session key establishing unit 102. The session key establishing unit 123 also one-way converts random number Y and compares the outcome "0011337788CCEEFFH" with a value sent back from the session key establishing unit 102. If they match, the session key establishing unit 123 verifies the recorder 100 as authorized. Accordingly, the session key establishing unit 123 XORs the two values "0011337788CCEEFFH" and "0F0F0F0F0F0F0F0FH" and further one-way converts the outcome "0F1E3C7887C3E1F0H", to generate the common session key.

(4) The management information acquiring unit 103 in the recorder 100 acquires management information "Lic" containing restrictive information and a content key "CK" (S13). Here, the management information acquiring unit 103 acquires the 16-byte management information "33333333333333330000000000000000AH" made up of the 8-byte content key "3333333333333333H" and the 8-byte restrictive information "000000000000000AH".

(5) The encrypting unit 108 in the management information processing unit 104 in the recorder 100 encrypts the management information "Lic" by a predetermined algorithm "E", using the card ID "CID" received by the card ID receiving unit 101 as an encryption key. As a result, encrypted management information "E(CID,Lic)" is generated (S14). In the present example, the management information "33333333333333330000000000000000AH" is encrypted using the card ID "0123456789ABCDEFH" into 16-byte encrypted management information.

(6) The data converting unit 109 in the management information processing unit 104 in the recorder 100 performs a predetermined data conversion (e.g. the XOR operation "XOR") on the encrypted management information "E(CID,Lic)", using the session key "SK1" generated by the session key establishing unit 102. Hence converted management information "XOR(SK1,E(CID,Lic))" is obtained (S15). In the present example, the 16-byte encrypted management information is XORed with 16-byte data generated by concatenating the same two 8-byte session keys, thereby yielding 16-byte converted management information.

(7) The sending unit 110 in the management information processing unit 104 in the recorder 100 sends the converted management information "XOR(SK1,E(CID,Lic))" to the memory card 120 (S16)

(8) The receiving unit 130 in the first management information processing unit 124 in the memory card 120 receives the converted management information "XOR(SK1,E(CID,Lic))" from the recorder 100 (S23).

(9) The inverse data converting unit 131 in the first management information processing unit 124 in the memory card 120 performs the inverse of the predetermined data conversion by the data converting unit 109 in the recorder 100, on the converted management information "XOR(SK1, E(CID,Lic))" using the session key "SK1" generated by the session key establishing unit 123. As a result, the encrypted management information "E(CID,Lic)" is obtained (S24). In the present example, the 16-byte converted management information is XORed with the 16-byte data generated by concatenating the same two 8-byte session keys, to thereby generate the 16-byte encrypted management information.

(10) The encrypted management information storing unit 125 in the memory card 120 stores the encrypted management information "E(CID,Lic)" into its inside nonvolatile memory (S25).

(11) The content acquiring unit 105 in the recorder 100 acquires digital content "Con" (S17). In the present example, the content acquiring unit 105 acquires 1-Mbyte digital content.

(12) The content encrypting unit 106 in the recorder 100 encrypts the acquired digital content "Con" according to a predetermined block cipher "E", using the content key "CK" in the management information "Lic" acquired by the management information acquiring unit 103. As a result, encrypted digital content "E(CK,Con)" is generated (S18). In the present example, after the 1-Mbyte digital content is divided into blocks of 8 bytes, each of the blocks is encrypted using the content key "3333333333333333H", and the encrypted blocks are concatenated to form 1-Mbyte encrypted digital content.

(13) The encrypted content sending unit 107 in the recorder 100 sends the encrypted digital content "E(CK, Con)" to the memory card 120 (S19).

(14) The encrypted content receiving unit 127 in the memory card 120 receives the encrypted digital content "E(CK,Con)" from the recorder 100 (S26).

(15) The encrypted content storing unit 128 in the memory card 120 stores the received encrypted digital content "E(CK,Con)" into its inside nonvolatile memory (S27).

The following is an explanation on how the memory card 120 and the player 140 operate to read and utilize encrypted digital content.

FIG. 7 is a flowchart showing the example operations of the memory card 120 and player 140 when reading and utilizing encrypted digital content.

(1) The card ID sending unit 122 in the memory card 120 sends the card ID "CID" held in the card ID holding unit 121, to the player 140 (S31). In the present example, the 8-byte card ID "0123456789ABCDEFH" is sent to the player 140.

(2) The card ID receiving unit 141 in the player 140 receives the card ID "CID" from the memory card 120 (S41).

(3) The session key establishing unit 123 in the memory card 120 and the session key establishing unit 142 in the player 140 exchange data such as random numbers, to establish a common session key "SK2" that differs in each session of reading encrypted digital content from the memory card 120 (S32, S42). In the present example, the session key establishing unit 123 generates and sends 8-byte random number N to the session key establishing unit 142, and receives 8-byte random number M from the session key establishing unit 142. The session key establishing unit 123 then one-way converts random number M and sends the outcome "1122448877BBDDEEH" back to the session key establishing unit 142. The session key establishing unit 123 also one-way converts random number N, and compares the outcome "F0F0F0F0F0F0F0F0H" with a value sent back from the session key establishing unit 142. If they match, the session key establishing unit 123 verifies the player 140 as authorized.

Following this, the session key establishing unit 123 XORs the two values "F0F0F0F0F0F0F0F0H" and "1122448877BBDDEEH" and further one-way converts the outcome "E1D2B478874B2D1EH", to generate a common session key. In the meantime, the session key establishing unit 142 generates and sends 8-byte random number M to the session key establishing unit 123, and receives 8-byte random number N from the session key establishing unit 123. The session key establishing unit 142 then one-way converts random number N and sends the outcome "F0F0F0F0F0F0F0F0H" back to the session key establishing unit 123. The session key establishing unit 142 also one-way converts random number M and compares the outcome "1122448877BBDDEEH" with a value sent back from the session key establishing unit 123. If they match, the session key establishing unit 142 verifies the memory card 120 as authorized. The session key establishing unit 142 accordingly XORs the two values "1122448877BBDDEEH" and "F0F0F0F0F0F0F0F0H" and further one-way converts the outcome "E1D2B478874B2D1EH", to generate the common session key.

(4) The data converting unit 132 in the second management information processing unit 126 in the memory card 120 performs a predetermined data conversion (e.g. the XOR operation "XOR") on the encrypted management information "E(CID,Lic)" stored in the encrypted management information storing unit 125, using the session key "SK2" generated by the session key establishing unit 123. Hence converted management information "XOR(SK2,E (CID,Lic))" is obtained (S33). In the present example, the 16-byte encrypted management information is XORed with 16-byte data generated by concatenating the same two 8-byte session keys, to thereby generate 16-byte converted management information.

(5) The sending unit 133 in the second management information processing unit 126 in the memory card 120 sends the converted management information "XOR(SK2, E(CID,Lic))" to the player 140 (S34).

(6) The receiving unit 148 in the management information processing unit 143 in the player 140 receives the converted management information "XOR(SK2,E(CID,Lic))" from the memory card 120 (S43).

(7) The inverse data converting unit 149 in the management information processing unit 143 in the player 140 performs the inverse of the predetermined data conversion by the data converting unit 132 in the memory card 120, on the converted management information "XOR(SK2,E(CID, Lic))" using the session key "SK2" generated by the session key establishing unit 142. As a result, the encrypted management information "E(CID,Lic)" is obtained (S44). In the present example, the 16-byte converted management information is XORed with the 16-byte data generated by concatenating the same two 8-byte session keys, to obtain the 16-byte encrypted management information.

(8) The decrypting unit 150 in the management information processing unit 143 in the player 140 decrypts the encrypted management information "E(CID,Lic)" according to the predetermined algorithm using the card ID "CID" as a decryption key, and so generates the management information "Lic" (S45). In this example, the 16-byte encrypted management information is decrypted with the card ID "0123456789ABCDEFH", so that the 16 byte management information "33333333333333330000000000000000AH" is generated.

(9) The management information analyzing unit 144 in the 110 player 140 analyzes the management information "Lic" generated by the management information processing unit 143, passes the content key "CK" contained in the management information "Lic" to the content decrypting unit 146, and controls the use of the digital content in accordance with the restrictive information contained in the management information "Lic" (S46). In this example, the 8-byte content key "3333333333333333H" in the 16 byte management information "33333333333333330000000000000000AH" is given to the content decrypting unit 146, and the 8-byte restrictive information "000000000000000AH" in the 16-byte management information is referenced to control the use of the digital content.

(10) The encrypted content sending unit 129 in the memory card 120 sends the encrypted digital content "E(CK,Con)" stored in the encrypted content storing unit 128, to the player 140 (S35)

(11) The encrypted content receiving unit 145 in the player 140 receives the encrypted digital content "E(CK, Con)" from the memory card 120 (S47).

(12) The content decrypting unit 146 in the player 140 decrypts the encrypted digital content "E(CK,Con)" according to the predetermined block cipher, using the content key "CK" given from the management information analyzing unit 144. Hence the digital content "Con" is obtained (S48). In the present example, after the 1-Mbyte encrypted digital content is divided into 8 byte blocks, the blocks are each decrypted using the content key "3333333333333333H", and the decrypted blocks are concatenated to form the 1-Mbyte digital content.

(13) The content utilizing unit 147 in the player 140 utilizes the digital content "Con" for musical reproduction and the like (S49).

With the above embodiment, encrypted management information including restrictive information is XOR-converted with a session key which differs in each send/receive session. Accordingly, even if the converted management information is backup copied in an earlier session and replaced with the backup copy in a later session, the backup copy is useless because it cannot be reconverted with a session key in the later session which differs with that used in the earlier session.

Though in the above embodiment the XOR operation for corresponding bits has been employed to convert encrypted management information due to its simple and fast processing, any cipher specified by a session key may instead be employed. Here, a random number may be added to a specific position (e.g. the beginning) in the encrypted management information prior to the data conversion. In so doing, the randomness of the converted management information increases, with it being possible to further strengthen the confidentiality of the information in communication.

Also, for generation of a session key, a chained cipher may be used whereby a new session key is generated based on a session key used and stored in an immediately preceding session. To generate the new session key from the stored session key, an operation such as increment, decrement, one or a combination of the four rules of arithmetic using a predetermined value, or a predetermined secret one-way conversion may be applied to the stored session key.

Though a common session key has been used according to a common key cipher in the above embodiment, a public key cipher may instead be employed whereby the sender's session key is a public key and the recipient's session key is a private key corresponding to the public key. Alternatively, a recovery-type signature scheme may be employed whereby the sender's session key is a private key and the recipient's session key is a public key corresponding to the private key.

Also, though random numbers have been exchanged to establish a common session key in the above embodiment, two devices may each generate the common session key independently, based on a value common to the entire system such as time-of-day data.

Also, a memory card equipped with a large-capacity semiconductor memory and a control circuit therefor has been used as a medium for storing encrypted digital content and encrypted management information in the above embodiment, such a medium may instead be any accessible storage medium, such as a hard disk, a floppy disk, a DVD-RAM (Digital Versatile Disk-Read Only Memory), or a CD-R (Compact Disk-Recordable), combined with a control device. Here, if a storage medium other than the memory card is used, a value uniquely given to the storage medium substitutes for the card ID.

Also, computer-readable storage mediums storing programs for executing the above embodied operations may be distributed for transactions.

The computer-readable storage mediums mentioned here may be removable storage mediums such as floppy disks, CDs, MOs (Magneto-Optical disks), DVDs, and memory cards, or fixed storage mediums such as hard disks and semiconductor memories.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An intelligent memory card comprising:
   a semiconductor memory for storing encrypted management information and encrypted digital data; and
   a control circuit for the semiconductor memory, the encrypted management information being generated by encrypting management information such that the encrypted management information can be decrypted based on a card ID uniquely given to the intelligent memory card, the management information containing decryption information for decrypting the encrypted digital data to digital data and restrictive information for restricting the use of the digital data, the restrictive information including information whose value changes over time,
   the semiconductor memory including:
      card ID holding means for holding the card ID;
      encrypted management information storing means for storing first encrypted management information which is generated by encrypting first management information based on the card ID held in the card ID holding means, the first management information containing first decryption information and first restrictive information; and
      encrypted digital data storing means for storing first encrypted digital data which is generated by encrypting digital data such that the first encrypted digital data can be decrypted based on the first decryption information, and
   the control circuit including:
      card ID providing means for providing an intelligent memory card utilizing device with the card ID held in the card ID holding means;
      key information acquiring means for acquiring first key information which differs in each send session and second key information which differs in each receive session;

data converting means for performing a data conversion specified by the first key information on the first encrypted management information stored in the encrypted management information storing means, to generate first converted management information;

sending means for sending the first converted management information generated by the data converting means and the first encrypted digital data stored in the encrypted digital data storing means without performing the data conversion on the first encrypted digital data, to the intelligent memory card utilizing device so that the digital data can be used;

receiving means for receiving second converted management information from the intelligent memory card utilizing device, the second converted management information being generated by the intelligent memory card utilizing device by performing a data conversion on second encrypted management information such that the second encrypted management information can be restored from the second converted management information by an inverse data conversion specified by the second key information, the second encrypted management information being generated by encrypting second management information based on the card ID, the second management information containing second restrictive information which is generated by the intelligent memory card utilizing device by updating the first restrictive information each time the digital data is used; and inverse data converting means for performing the inverse data conversion on the second converted management information received by the receiving means, to restore the second encrypted management information, wherein the encrypted management information storing means stores the second encrypted management information restored by the inverse data converting means.

2. The intelligent memory card of claim 1, wherein the second management information further contains second decryption information, the receiving means receives second encrypted digital data together with the second converted management information from the intelligent memory card utilizing device, the second encrypted digital data being generated by encrypting the digital data such that the second encrypted digital data can be decrypted based on the second decryption information, and the encrypted digital data storing means stores the second encrypted digital data received by the receiving means, without performing the inverse data conversion on the second encrypted digital data.

3. The intelligent memory card of claim 1, wherein the second management information further contains second decryption information which is the same as the first decryption information.

4. The intelligent memory card of claim 1, wherein the key information acquiring means acquires the first key information and the second key information which are also acquired by the intelligent memory card utilizing device, the data converting means encrypts the first encrypted management information using the first key information as a common key in a common key cipher, to generate the first converted management information, and the inverse data converting means decrypts the second converted management information using the second key information as a common key in a common key cipher, to restore the second encrypted management information.

5. The intelligent memory card of claim 4, wherein without each of the first key information and the second key information being transferred between the intelligent memory card and the intelligent memory card utilizing device, the key information acquiring means acquires each of the first key information and the second key information by subjecting base data, which is commonly established in the key information acquiring means and the intelligent memory card utilizing device through an exchange of data other than each of the first key information and the second key information, to a secret data conversion that is also provided in the intelligent memory card utilizing device.

6. The intelligent memory card of claim 4, wherein without each of the first key information and the second key information being transferred between the intelligent memory card and the intelligent memory card utilizing device, the key information acquiring means acquires each of the first key information and the second key information by subjecting time-of-day data, which is common in the intelligent memory card and the intelligent memory card utilizing device, to a secret data conversion that is also provided in the intelligent memory card utilizing device.

7. The intelligent memory card of claim 4, wherein the semiconductor memory further includes:

key information storing means for storing at least one of previous first key information used in an immediately preceding send session and previous second key information used in an immediately preceding receive session, as at least one set of previous key information, and the key information acquiring means acquires the first key information by applying a first predetermined conversion to one of the at least one set of previous key information stored in the key information storing means in each send session, and acquires the second key information by applying a second predetermined conversion to one of the at least one set of previous key information stored in the key information storing means in each receive session.

8. The intelligent memory card of claim 7, wherein each of the first predetermined conversion and the second predetermined conversion is any of: an incrementing; a decrementing: one or a combination of the four arithmetic operations using a predetermined value: and a predetermined secret one-way conversion.

9. The intelligent memory card of claim 4, wherein the data converting means performs an exclusive-OR operation on the first encrypted management information and the first key information, to generate the first converted management information, and the inverse data converting means performs an exclusive-OR operation on the second converted management information and the second key information, to restore the second encrypted management information.

10. The intelligent memory card of claim 1, wherein the key information acquiring means acquires the first key information as a public key in a public key cipher, with a private key corresponding to the public key being acquired by the intelligent memory card utilizing device, the data converting means encrypts the first encrypted management information using the first key information according to the public key cipher, to generate the first converted management information, the key information acquiring means acquires the second key information as a private key in a public key cipher, with a public key corresponding to the private key being acquired by the intelligent memory card utilizing device, and the inverse data converting means decrypts the second converted management information using the second key information according to the public key cipher, to restore the second encrypted management information.

11. The intelligent memory card of claim 1, wherein the key information acquiring means acquires the first key information as a private key in a recovery-type signature scheme, with a public key corresponding to the private key being acquired by the intelligent memory card utilizing device, the data converting means encrypts the first encrypted management information using the first key information according to the recovery-type signature scheme, to generate the first converted management information, the key information acquiring means acquires the second key information as a public key in a recovery-type signature scheme, with a private key corresponding to the public key being acquired by the intelligent memory card utilizing device, and the inverse data converting means decrypts the second converted management information using the second key information according to the recovery-type signature scheme, to restore the second encrypted management information.

12. The intelligent memory card of claim 1, wherein the data converting means generates a random number in each send session, and, having added the generated random number to a predetermined position in the first encrypted management information, performs the data conversion on the first encrypted management information, the second converted management information received by the receiving means is obtained by adding a random number to a predetermined position in the second encrypted management information and then performing the data conversion on the second encrypted management information, and the inverse data converting means performs the inverse data conversion on the second converted management information and then removes the random number from the predetermined position in an inverse data conversion result of the second converted management information, to restore the second encrypted management information.

13. An intelligent memory card utilizing device which (a) receives encrypted digital data and encrypted management information from an intelligent memory card and uses the encrypted digital data and the encrypted management information, and (b) sends the encrypted management information to the intelligent memory card to be stored thereon, the encrypted management information being generated by encrypting management information such that the encrypted management information can be decrypted based on a card ID uniquely given to the intelligent memory card, the management information containing decryption information for decrypting the encrypted digital data to digital data and restrictive information for restricting the use of the digital data, the restrictive information including information whose value changes over time, comprising:

card ID acquiring means for acquiring the card ID from the intelligent memory card;

key information acquiring means for acquiring first key information which differs in each receive session, and second key information which differs in each send session;

receiving means for receiving first converted management information and first encrypted digital data from the intelligent memory card, the first converted management information being generated by the intelligent memory card by performing a data conversion on first encrypted management information such that the first encrypted management information can be restored from the first converted management information by an inverse data conversion specified by the first key information, the first encrypted management information being generated by encrypting first management information based on the card ID, the first management information containing first decryption information and first restrictive information, the first encrypted digital data being generated by encrypting digital data such that the first encrypted digital data can be decrypted based on the first decryption information;

inverse data converting means for performing the inverse data conversion on the first converted management information received by the receiving means, to restore the first encrypted management information;

management information decrypting means for decrypting the first encrypted management information restored by the inverse data converting means based on the card ID, to obtain the first management information;

digital data decrypting means for decrypting the first encrypted digital data received by the receiving means based on the first decryption information contained in the first management information without performing the inverse data conversion on the first encrypted digital data, to obtain the digital data;

utilizing means for using the digital data obtained by the digital data decrypting means, in accordance with the first restrictive information contained in the first management information;

management information updating means for updating the first restrictive information and setting the updated first restrictive information as second restrictive information each time the digital data is used, and generating second management information which contains the second restrictive information;

management information encrypting means for encrypting the second management information generated by the management information updating means to generate second encrypted management information such that the second encrypted management information can be decrypted based on the card ID;

data converting means for performing a data conversion specified by the second key information on the second encrypted management information generated by the management information encrypting means, to generate second converted management information; and sending means for sending the second converted management information generated by the data converting means, to the intelligent memory card.

14. The intelligent memory card utilizing device of claim 13, wherein the second management information further contains second decryption information, the intelligent memory card utilizing device further comprises:

digital data encrypting means for encrypting the digital data to generate second encrypted digital data such that the second encrypted digital data can be decrypted based on the second decryption information, and the sending means sends the second encrypted digital data generated by the digital data encrypting means to the intelligent memory card together with the second converted management information, without performing the data conversion on the second encrypted digital data.

15. The intelligent memory card utilizing device of claim 13, wherein the second management information further contains second decryption information which is the same as the first decryption information.

16. The intelligent memory card utilizing device of claim 13, wherein the key information acquiring means acquires the first key information and the second key information which are also acquired by the intelligent memory card, the inverse data converting means decrypts the first converted management information using the first key information as a common key in a common key cipher, to restore the first encrypted management information, and the data converting means encrypts the second encrypted management information using the second key information as a common key in a common key cipher, to generate the second converted management information.

17. The intelligent memory card utilizing device of claim 16, wherein without each of the first key information and the second key information being transferred between the intelligent memory card utilizing device and the intelligent memory card, the key information acquiring means acquires each of the first key information and the second key information by subjecting base data, which is commonly established in the key information acquiring means and the intelligent memory card through an exchange of data other than each of the first key information and the second key information, to a secret data conversion that is also provided in the intelligent memory card.

18. The intelligent memory card utilizing device of 16, wherein without each of the first key information and the second key information being transferred between the intelligent memory card utilizing device and the intelligent memory card, the key information acquiring means acquires each of the first key information and the second key information by subjecting time-of-day data, which is common in the intelligent memory card utilizing device and the intelligent memory card, to a secret data conversion that is also provided in the intelligent memory card.

19. The intelligent memory card utilizing device of claim 16, further comprising:

key information storing means for storing at least one of previous first key information used in an immediately preceding receive session and previous second key information used in an immediately preceding send session, as at least one set of previous key information, wherein the key information acquiring means acquires the first key information by applying a first predetermined conversion to one of the at least one set of previous key information stored in the key information storing means in each receive session, and acquires the second key information by applying a second predetermined conversion to one of the at least one set of previous key information stored in the key information storing means in each send session.

20. The intelligent memory card utilizing device of claim 19, wherein each of the first predetermined conversion and the second predetermined conversion is any of: an incrementing; a decrementing; one or a combination of the four arithmetic operations using a predetermined value; and a predetermined secret one-way conversion.

21. The intelligent memory card utilizing device of claim 16, wherein the inverse data converting means performs an exclusive-OR operation on the first converted management information and the first key information, to restore the first encrypted management information, and the data converting means performs an exclusive-OR operation on the second encrypted management information and the second key information, to generate the second converted management information.

22. The intelligent memory card utilizing device of claim 13, wherein the key information acquiring means acquires the first key information as a private key in a public key cipher, with a public key corresponding to the private key being acquired by the intelligent memory card, the inverse data converting means decrypts the first converted management information using the first key information according to the public key cipher, to restore the first encrypted management information, the key information acquiring means further acquires the second key information as a public key in a public key cipher, with a private key corresponding to the public key being acquired by the intelligent memory card, and the data converting means encrypts the second encrypted management information using the second key information according to the public key cipher, to generate the second converted management information.

23. The intelligent memory card utilizing device of 13, wherein the key information acquiring means acquires the first key information as a public key in a recovery-type signature scheme, with a private key corresponding to the public key being acquired by the intelligent memory card, the inverse data converting means decrypts the first converted management information using the first key information according to the recovery-type signature scheme, to restore the first encrypted management information, the key information acquiring means acquires the second key information as a private key in a recovery-type signature scheme, with a public key corresponding to the private key being acquired by the intelligent memory card, and the data converting means encrypts the second encrypted management information using the second key information according to the recovery-type signature scheme, to generate the second converted management information.

24. The intelligent memory card utilizing device of claim 13, wherein the receiving means receives the first converted management information in which a random number has been added to a predetermined position prior to the data conversion, the inverse data converting means performs the inverse data conversion on the first converted management information and then removes the random number from the predetermined position in an inverse data conversion result of the first converted management information, to restore the first encrypted management information, and the data converting means generates a random number in each send session and, having added the generated random number to a predetermined position in the second encrypted management information, performs the data conversion on the second encrypted management information.

25. An intelligent memory card utilizing method which (a) sends encrypted digital data and encrypted management information from an intelligent memory card to an intelligent memory card utilizing device and uses the encrypted digital data and the encrypted management information in the intelligent memory card utilizing device, and (b) sends the encrypted management information from the intelligent memory card utilizing device to the intelligent memory card to be recorded thereon, the encrypted management information being generated by encrypting management information such that the encrypted management information can be decrypted based on a card ID uniquely given to the intelligent memory card, the management information containing decryption information for decrypting the encrypted digital data to digital data and restrictive information for restricting the use of the digital data, the restrictive information including information whose value changes over time, the intelligent memory card including: card ID holding means for holding the card ID; encrypted management information storing means for storing first encrypted management information which is generated by encrypting first management information based on the card ID held in the card ID holding means, the first management information containing first decryption information and first restrictive information; and encrypted digital data storing means for storing first encrypted digital data which is generated by encrypting digital data such that the first encrypted digital data can be decrypted based on the first decryption information, the intelligent memory card utilizing method comprising:

a card ID providing step for providing the card ID held in the card ID holding means, from the intelligent memory card to the intelligent memory card utilizing device;

a key information generating step for (a) generating, in each send session from the intelligent memory card to the intelligent memory card utilizing device, first conversion key information for specifying a data conversion in the intelligent memory card and first inverse conversion information for specifying an inverse of the data conversion in the intelligent memory card utilizing device, and (b) generating, in each send session from the intelligent memory card utilizing device to the intelligent memory card, second conversion key information for specifying a data conversion in the intelligent memory card utilizing device and second inverse conversion key information for specifying an inverse of the data conversion in the intelligent memory card;

a first data converting step for, in the intelligent memory card, performing the data conversion specified by the first conversion key information on the first encrypted management information stored in the encrypted management information storing means, to generate first converted management information;

a first converted management information sending step for sending the first converted management information from the intelligent memory card to the intelligent memory card utilizing device;

a first inverse data converting step for, in the intelligent memory card utilizing device, performing the inverse data conversion specified by the first inverse conversion key information on the first converted management information, to restore the first encrypted management information;

a digital data sending step for sending the first encrypted digital data stored in the encrypted digital data storing means, from the intelligent memory card to the intelligent memory card utilizing device;

a management information decrypting step for, in the intelligent memory card utilizing device, decrypting the first encrypted management information based on the card ID to obtain the first management information;

a digital data decrypting step for, in the intelligent memory card utilizing device, decrypting the first encrypted digital data based on the first decryption information contained in the first management information, to obtain the digital data;

a utilizing step for, in the intelligent memory card utilizing device, using the digital data in accordance with the first restrictive information contained in the first management information;

a management information updating step for, in the intelligent memory card utilizing device, updating the first restrictive information and setting the updated first restrictive information as second restrictive information each time the digital data is used, and generating second management information which contains the second restrictive information;

a management information encrypting step for, in the intelligent memory card utilizing device, encrypting the second management information to generate second encrypted management information such that the second encrypted management information can be decrypted based on the card ID;

a second data converting step for, in the intelligent memory card utilizing device, performing the data conversion specified by the second conversion key information on the second encrypted management information, to generate second converted management information;

a second converted management information sending step for sending the second converted management information from the intelligent memory card utilizing device to the intelligent memory card;

a second inverse data converting step for, in the intelligent memory card, performing the inverse data conversion specified by the second inverse conversion key information on the second converted management information, to restore the second encrypted management information; and a management information storing step for, in the intelligent memory card, recording the second encrypted management information in the encrypted management information storing means.

26. A computer-readable storage medium storing an intelligent memory card utilizing program used in an intelligent memory card utilizing device which (a) receives encrypted digital data and encrypted management information from an intelligent memory card and uses the encrypted digital data and the encrypted management information, and (b) sends the encrypted management information to the intelligent memory card to be stored thereon, the encrypted management information being generated by encrypting management information such that the encrypted management information can be decrypted based on a card ID uniquely given to the intelligent memory card, the management information containing decryption information for decrypting the encrypted digital data to digital data and restrictive information for restricting the use of the digital data, the restrictive information including information whose value changes over time, the intelligent memory card utilizing program comprising:

a card ID acquiring step for acquiring the card ID from the intelligent memory card;

a key information acquiring step for acquiring first key information which differs in each receive session, and second key information which differs in each send session;

a receiving step for receiving first converted management information and first encrypted digital data from the intelligent memory card, the first converted management information being generated by the intelligent memory card by performing a data conversion on first encrypted management information such that the first encrypted management information can be restored from the first converted management information by an inverse data conversion specified by the first key information, the first encrypted management information being generated by encrypting first management information based on the card ID, the first management information containing first decryption information and first restrictive information, the first encrypted digital data being generated by encrypting digital data such that the first encrypted digital data can be decrypted based on the first decryption information;

an inverse data converting step for performing the inverse data conversion on the first converted management information received by the receiving step, to restore the first encrypted management information;

a management information decrypting step for decrypting the first encrypted management information restored by the inverse data converting step based on the card ID, to obtain the first management information;

a digital data decrypting step for decrypting the first encrypted digital data received by the receiving step based on the first decryption information contained in the first management information without performing the inverse data conversion on the first encrypted digital data, to obtain the digital data;

a utilizing step for using the digital data obtained by the digital data decrypting step, in accordance with the first restrictive information contained in the first management information;

a management information updating step for updating the first restrictive information and setting the updated first restrictive information as second restrictive information each time the digital data is used, and generating second management information which contains the second restrictive information;

a management information encrypting step for encrypting the second management information generated by the management information updating step to generate second encrypted management information such that the second encrypted management information can be decrypted based on the card ID;

a data converting step for performing a data conversion specified by the second key information on the second encrypted management information generated by the management information encrypting step, to generate second converted management information; and a sending step for sending the second converted management information generated by the data converting step, to the intelligent memory card.

* * * * *